US012147179B2

(12) United States Patent
Matsuura et al.

(10) Patent No.: US 12,147,179 B2
(45) Date of Patent: Nov. 19, 2024

(54) FIXING DEVICE WITH HOLDING MEMBER MADE OF RESIN

(71) Applicant: CANON KABUSHIKI KAISHA, Tokyo (JP)

(72) Inventors: Daigo Matsuura, Tokyo (JP); Yasuharu Toratani, Chiba (JP); Akiyoshi Shinagawa, Saitama (JP); Hiroshi Miyamoto, Saitama (JP); Ayano Ogata, Ibaraki (JP); Hiroki Kawai, Chiba (JP); Masanobu Tanaka, Chiba (JP); Asuna Fukamachi, Chiba (JP); Misa Kawashima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/161,164

(22) Filed: Jan. 30, 2023

(65) Prior Publication Data

US 2023/0273554 A1 Aug. 31, 2023

(30) Foreign Application Priority Data

Feb. 28, 2022 (JP) ................................ 2022-028931

(51) Int. Cl.
*G03G 15/20* (2006.01)

(52) U.S. Cl.
CPC ..... *G03G 15/2053* (2013.01); *G03G 15/2017* (2013.01); *G03G 15/2064* (2013.01); *G03G 2215/2035* (2013.01)

(58) Field of Classification Search
CPC .......... G03G 15/2053; G03G 15/2064; G03G 15/2017; G03G 15/2032; G03G 2215/2016; G03G 2215/2035; G03G 2215/2038
See application file for complete search history.

(56) References Cited

U.S. PATENT DOCUMENTS 10,901,353 B2 1/2021 Tanaka et al.
11,156,948 B2 10/2021 Tanaka et al.
11,194,275 B2 12/2021 Takemasa et al.
11,300,906 B2 4/2022 Takemasa et al.
2017/0097598 A1* 4/2017 Kudo ................ G03G 15/2053
2017/0176905 A1* 6/2017 Suzuki .............. G03G 15/2053
2018/0284663 A1* 10/2018 Matsuda ........... G03G 15/2042

FOREIGN PATENT DOCUMENTS

JP 2020-52354 A 4/2020

* cited by examiner

*Primary Examiner* — Arlene Heredia
*Assistant Examiner* — Laura Roth
(74) *Attorney, Agent, or Firm* — Venable LLP

(57) ABSTRACT

A fixing device includes an endless belt, a rotatable pressing member contacting an outer circumferential surface of the belt, and a sliding member inside of the belt. The sliding member forms a nip portion by nipping and feeding the belt between itself and the rotatable pressing member and slides on an inner circumferential surface of the belt. The rotatable pressing member nips and feeds the recording material in the nip portion in cooperation with the belt and fixes a toner image on the recording material by applying heat and pressure. The sliding member includes a substrate extending in a widthwise direction of the belt, and the substrate is made of metal and includes a plurality of projections projecting toward the rotatable pressing member.

9 Claims, 12 Drawing Sheets

| FRICTION FORCE[N] |
|---|
| 48 |

| MATERIAL OF BASE MATERIAL LAYER | THICKNESS[mm] | YOUNG'S MODULUS [MPa] | ALLOWABLE RATE OF FRICTION FORCE [-] | RANK OF GLOSS UNEVENNESS |
|---|---|---|---|---|
| POLYIMIDE | 0.075 | 36000 | 10303.2 | 1 |
| POLYIMIDE | 0.2 | 36000 | 543.3 | 5 |
| PEEK | 0.2 | 3000 | 652.0 | 5 |
| ALUMINUM | 0.03 | 70000 | 8279.4 | 2 |
| STAINLESS STEEL | 0.036 | 200000 | 1677.0 | 4 |

(a)

(b)

(a)

(b)

(a)

(b)

| FRICTION FORCE[N] |
|---|
| 48 |

| MATERIAL OF BASE MATERIAL LAYER | THICKNESS[mm] | YOUNG'S MODULUS [MPa] | ALLOWABLE RATE OF FRICTION FORCE [-] | RANK OF GLOSS UNEVENNESS |
|---|---|---|---|---|
| POLYIMIDE | 0.075 | 36000 | 10303.2 | 1 |
| POLYIMIDE | 0.2 | 36000 | 543.3 | 5 |
| PEEK | 0.2 | 3000 | 652.0 | 5 |
| ALUMINUM | 0.03 | 70000 | 8279.4 | 2 |
| STAINLESS STEEL | 0.036 | 200000 | 1677.0 | 4 |

Fig. 8

FIXING DEVICE WITH HOLDING MEMBER MADE OF RESIN

FIELD OF THE INVENTION AND RELATED ART

The present invention relates to a fixing device that fixes a toner image borne on a recording material to the recording material.

As a fixing device, a nip portion is formed by a nip portion forming member such as a belt and rollers to nip and feed the recording material passing through the nip portion, and the recording material is heated and pressurized. In this configuration, a nip portion is formed between the belt and the nip portion forming member by sliding the sliding member on the inner circumference of the belt in the nip portion.

In order to guarantee the quality of the image to be fixed on the recording material, the fixing device is required to suppress the slip between the recording material and the belt fed to the nip portion and the slip between the recording material and the nip portion forming member. For this purpose, the frictional force between the belt and the sliding member is required to be smaller than the frictional forces between the recording material and the belt and between the recording material and the nip portion forming member. In particular, in a configuration with a wide nip portion, where the nip portion is wider to increase heating efficiency, the frictional force between the belt and the sliding member is required to be reduced.

For example, Japanese Laid-Open Patent Application 2020-52354 discloses a configuration in which unevenness is formed on the sliding sheet that moves with the inner surface of the belt in the nip portion to reduce the friction force between the sliding sheet and the belt.

When the belt and the sliding member are sliding as described above, if the frictional force acting on the nip portion increases, the sliding member may be deformed and pressure irregularities may occur in the nip portion. If pressure irregularities occur, gloss irregularities may occur in the fixed image. In particular, in a wide nip configuration with a wide nip portion, the frictional force acting on the nip portion tends to increase.

The purpose of the present invention is to provide a configuration that can both suppress the occurrence of uneven gloss and suppress the occurrence of wrinkles on the recording material.

SUMMARY OF THE INVENTION

According to an aspect of the present invention, there is provided a fixing device comprising: an endless belt configured to apply heat to a recording material; a rotatable pressing member contacting an outer circumferential surface of the belt; and a sliding member inside of the belt, configured to form a nip portion by nipping and feeding the belt between itself and the rotatable pressing member and to slide on an inner circumferential surface of the belt, wherein the rotatable pressing member nips and feeds the recording material in the nip portion in cooperation with the belt and fixes a toner image on the recording material by applying heat and pressure, wherein the sliding member includes a substrate extending in a widthwise direction of the belt, and wherein the substrate is made of metal and includes a plurality of projections projecting toward the rotatable pressing member.

Further features of the present invention will become apparent from the following description of exemplary embodiments with reference to the attached drawings.

Figure 2:
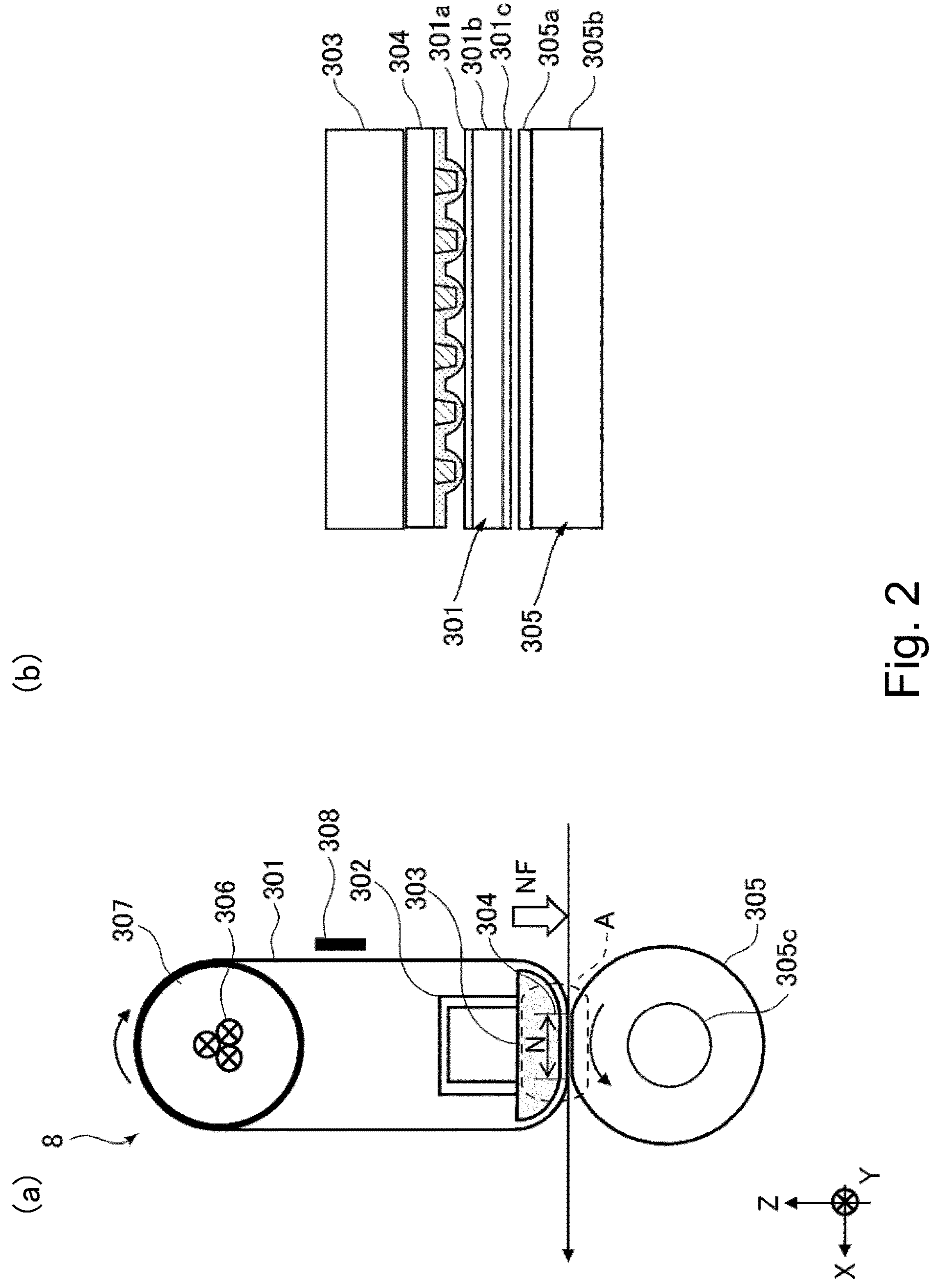

Part (a) of FIG. 2 is a schematic cross-sectional view of the fixing device according to the embodiment, and part (b) of FIG. 2 is a schematic view of the enlarging portion A of part (a) of FIG. 2.

Figure 3:
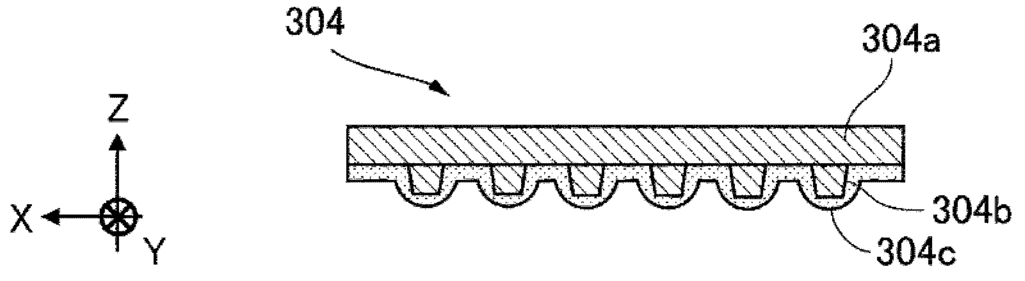
Figure 3:
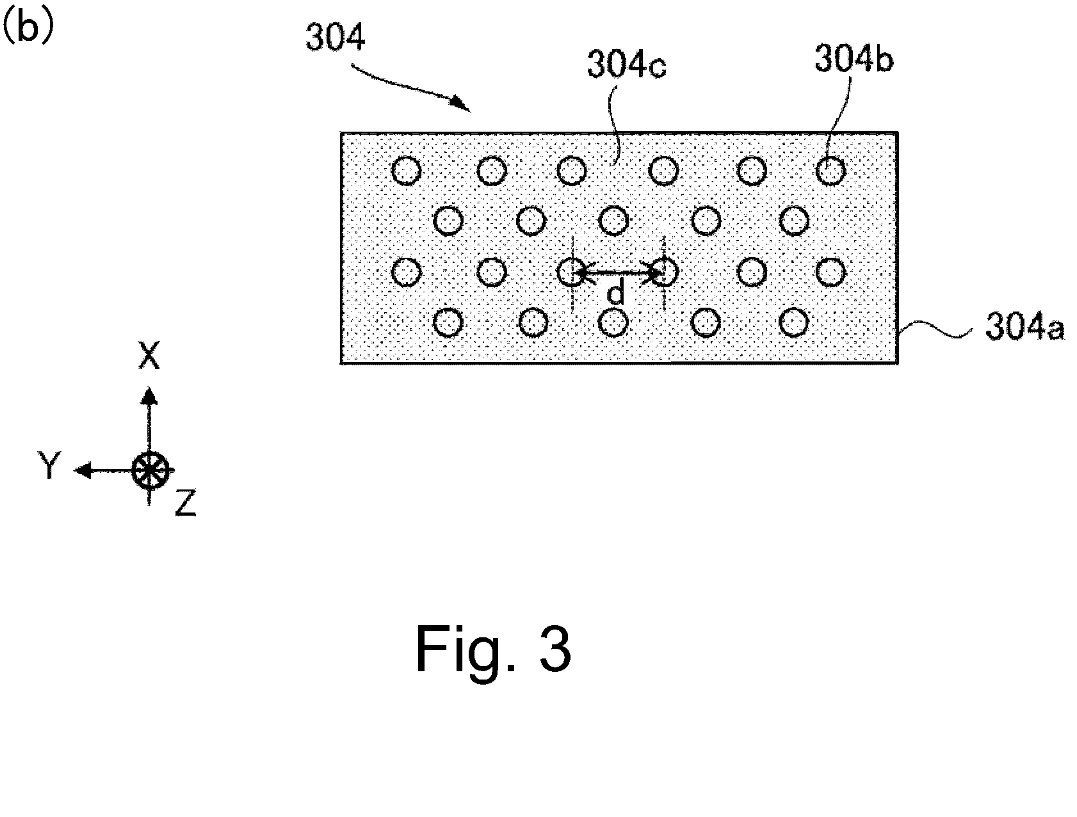

FIG. 3, part (a) and part (b), is a schematic view of a sliding member according to the embodiment, with part (a) of FIG. 3 being a cross-sectional view, and part (b) of FIG. 3 being a plan view.

Figure 4:
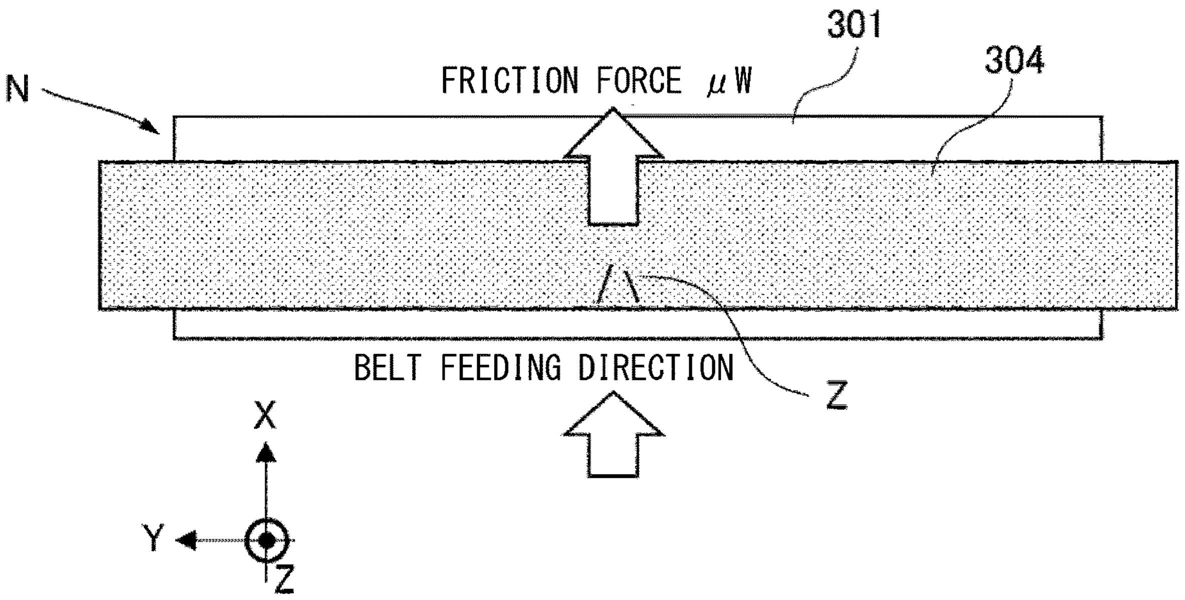

FIG. 4 is a schematic view showing the relationship between the sliding member and the belt according to the embodiment.

Figure 5:
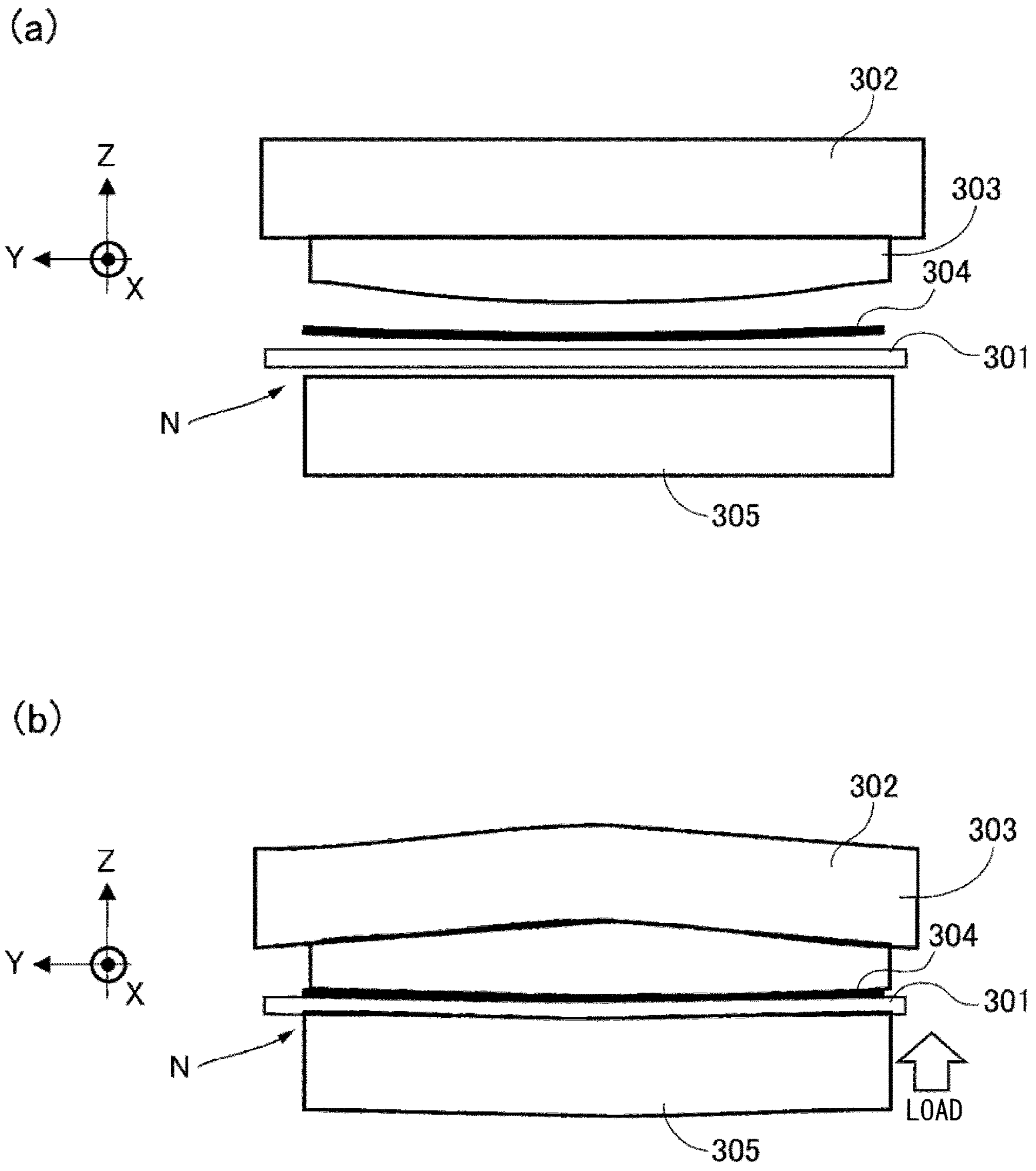

Part (a) of FIG. 5 is a cross-sectional view schematically showing the configuration around the nip portion when not under pressure, and part (b) of FIG. 5 is a cross-sectional view schematically showing the configuration around the nip portion when under pressure.

Figure 6:
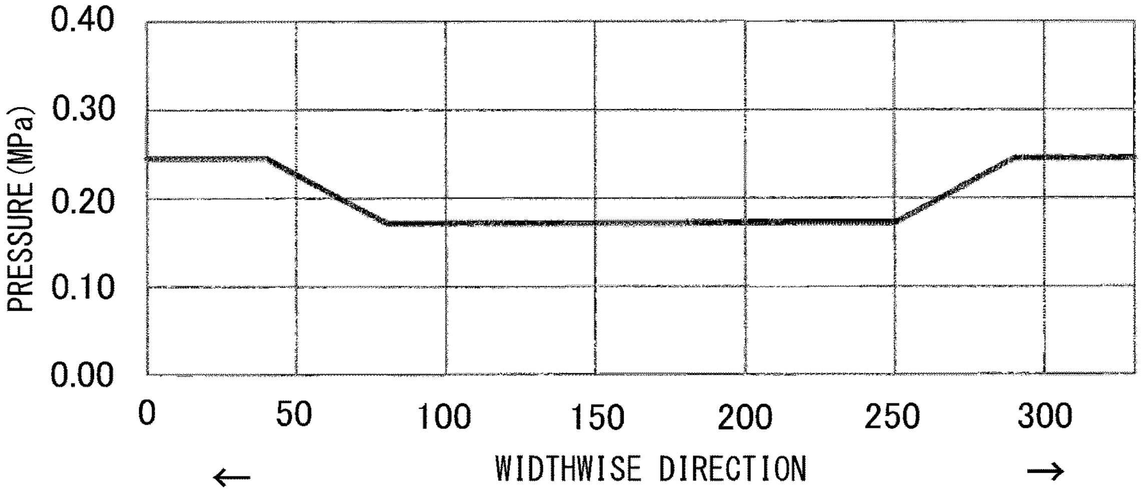
Figure 6:
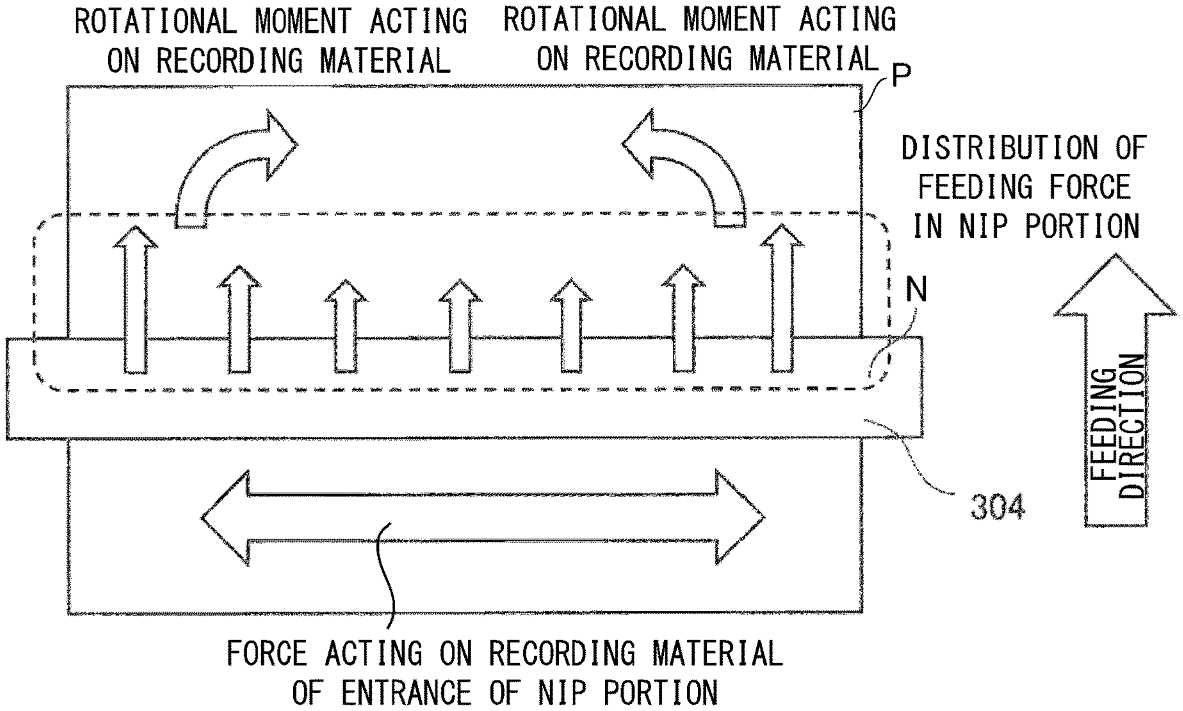

Part (a) of FIG. 6 is a graph showing the pressure distribution in the widthwise direction of an ideal nip portion, and part (b) of FIG. 6 is a schematic view showing the relationship between the forces during feeding of the recording material in an ideal nip portion.

Figure 7:
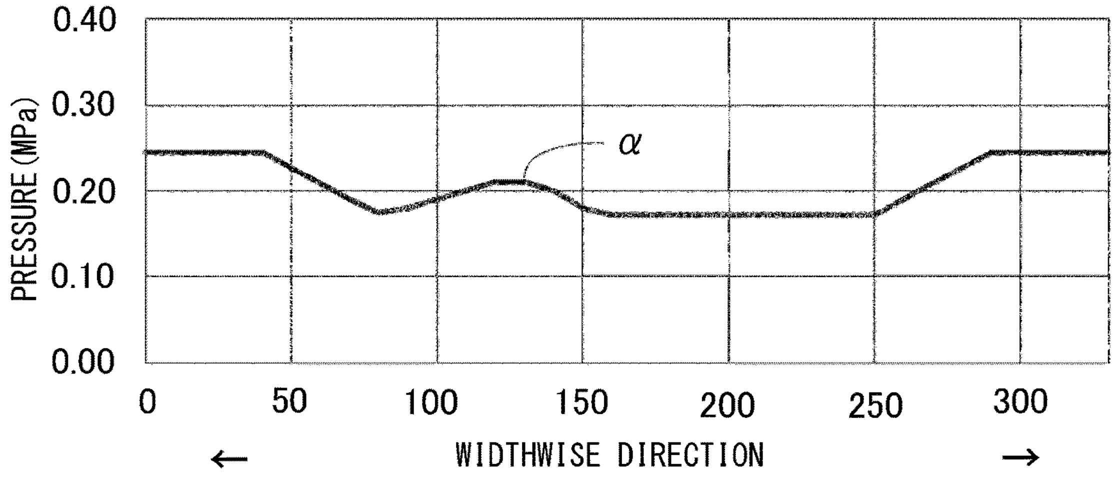
Figure 7:
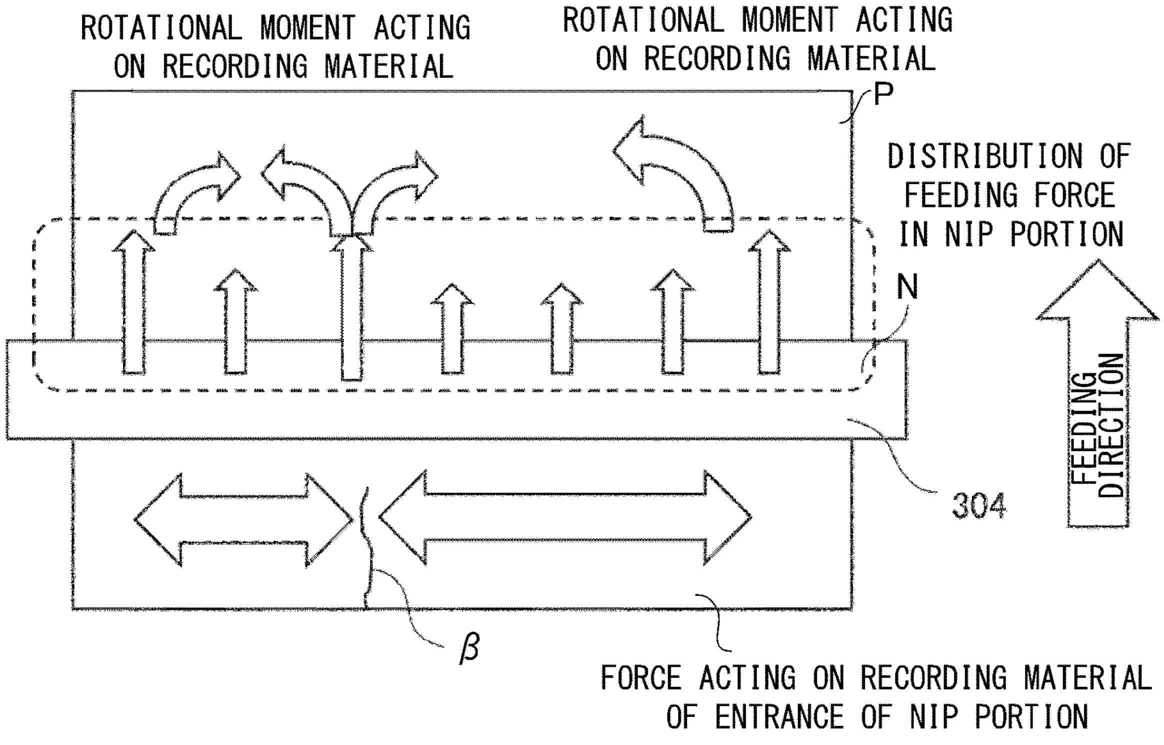

Part (a) of FIG. 7 is a graph showing the pressure distribution in the widthwise direction of the nip portion in a comparative example, and part (b) of FIG. 7 is a schematic view showing the relationship between the forces during feeding of the recording material in the nip portion in a comparative example.

FIG. 8 is a table showing the conditions of the various sliding members used in Evaluation 1.

Figure 9:
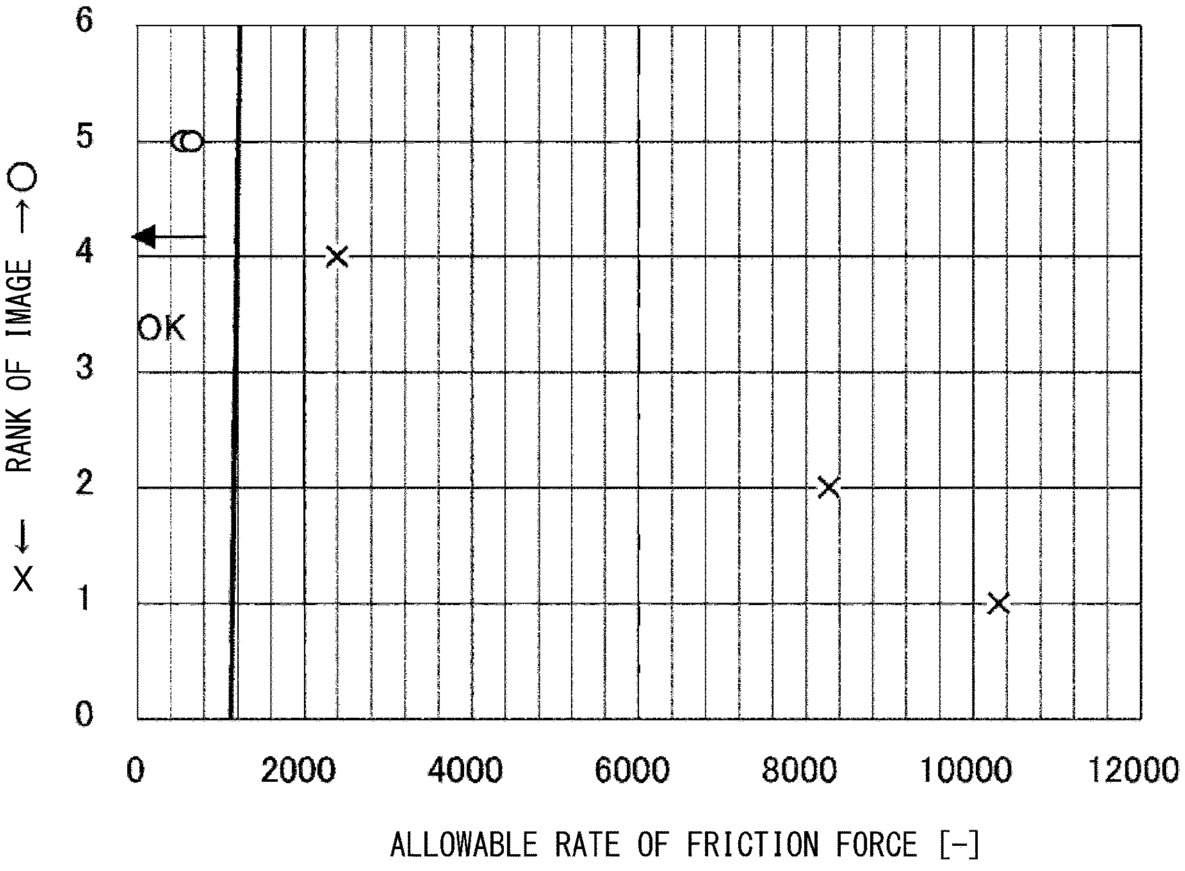

FIG. 9 is a graph showing the results of Evaluation 1.

Figure 10:
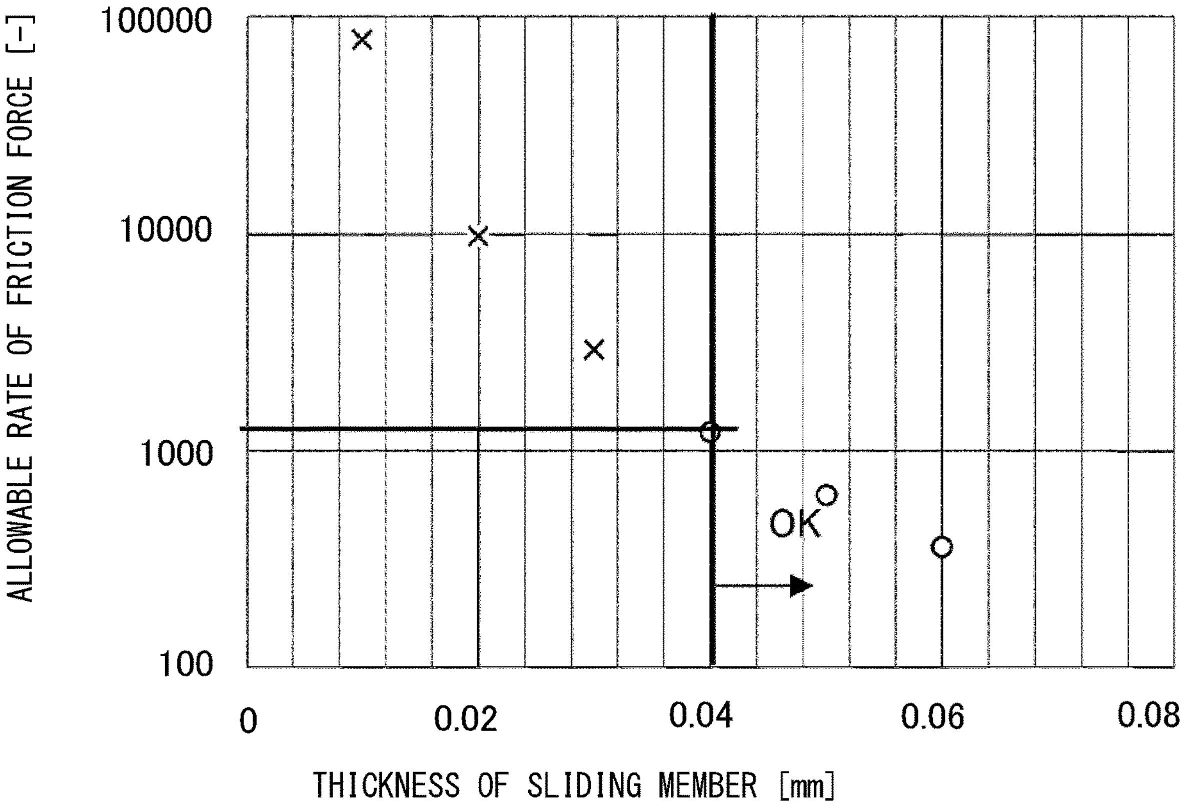

FIG. 10 is a graph showing the results of Evaluation 2.

Figure 11:
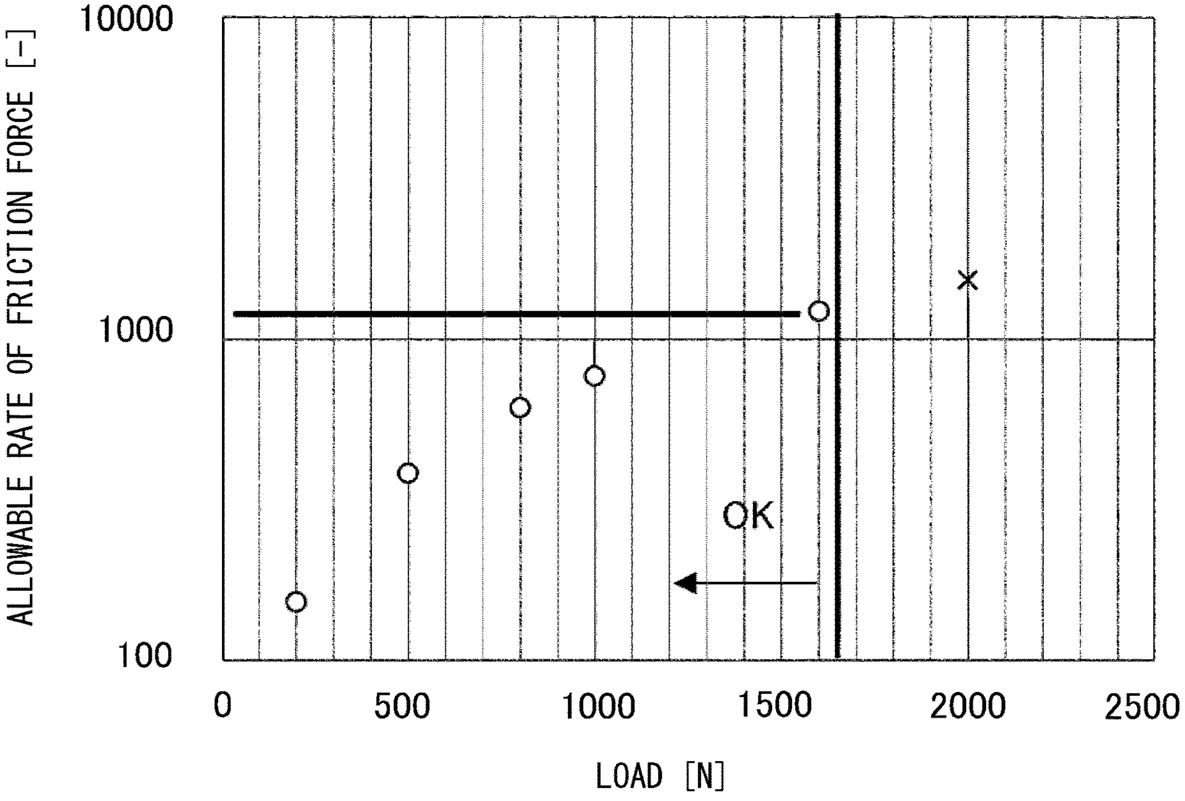

FIG. 11 is a graph showing the results of Evaluation 3.

Figure 12:
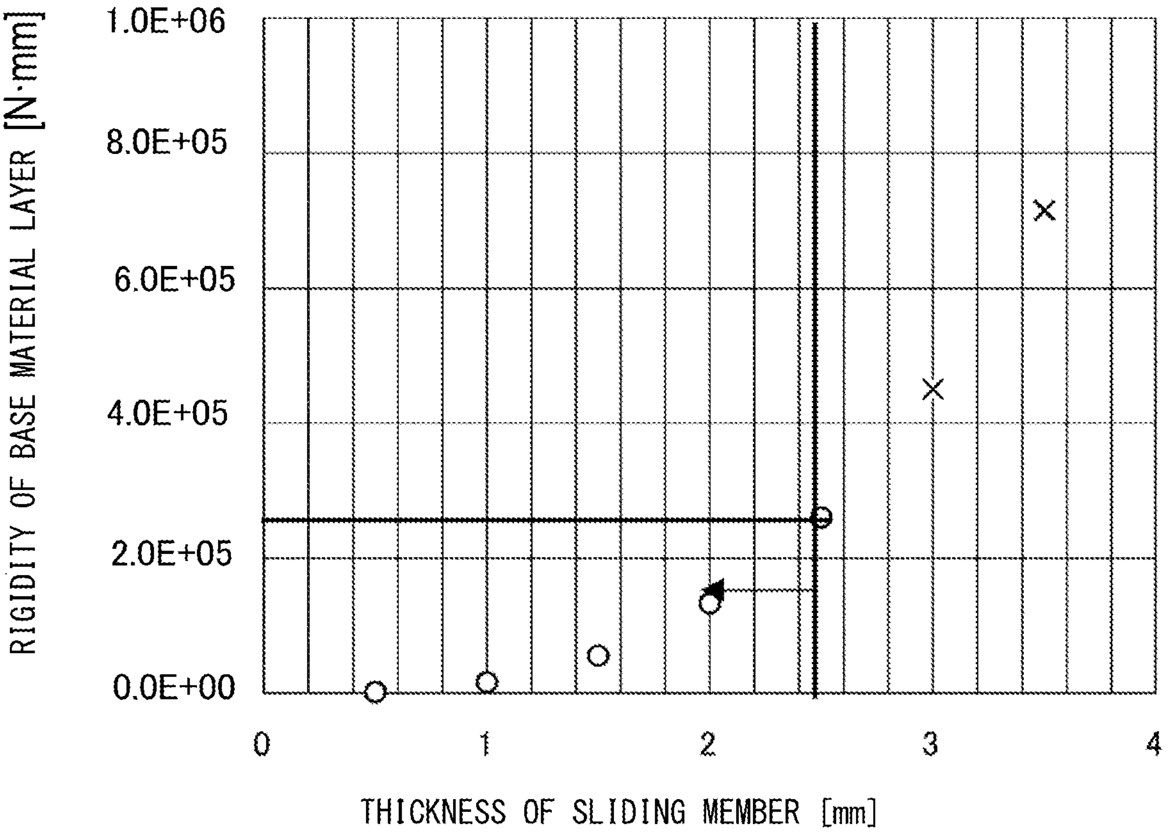

FIG. 12 is a graph showing the results of Evaluation 4.

DESCRIPTION OF THE EMBODIMENTS

The embodiment of the present invention is explained using FIGS. 1 through 12. First, the schematic configuration of an image forming apparatus of the present embodiment is explained using FIG. 1.

Image Forming Apparatus

An image forming apparatus 1 is an electrophotographic full-color printer with four image forming portions Pa, Pb, Pc, and Pd, which are provided for four colors: yellow, magenta, cyan, and black. In the present embodiment, the image forming portions Pa, Pb, Pc, and Pd are arranged along the rotational direction of an intermediate transfer belt 204, which is explained later, in a tandem configuration. The image forming apparatus 1 forms toner images (images) on a recording material in response to image signals from an image reading portion (document reader) 2 connected to the main assembly of the image forming apparatus 3 or a host device such as a personal computer connected to the main assembly of the image forming apparatus 3 for communication. Recording materials include paper, plastic film, cloth, and other sheet materials.

The image forming apparatus 1 is equipped with an image reading portion 2 and the main assembly of the image forming apparatus 3. The image reading portion 2 reads a document placed on a document bed glass 21. Light emitted from a light source 22 is reflected by the document and formed into an image on a CCD sensor 24 through an optical member 23 such as a lens. The optical unit scans the document in the direction of the arrow and converts the document into a line-by-line electrical signal data sequence. The image signal obtained by the CCD sensor 24 is sent to the main assembly of the image forming apparatus 3, where a control portion 30 performs image processing tailored to each image forming portion as described below. The control portion 30 also receives external input from an external host device such as a print server as image signals.

The main assembly of the image forming apparatus 3 is equipped with a plurality of image forming portions Pa, Pb, Pc, and Pd, each of which performs image forming based on the image signals described above. That is, the image signal is converted into a PWM (pulse width modulation controlled) laser beam by the control portion 30. A polygon scanner 31 as an exposure unit scans the laser beam according to the image signal. The laser beam is then irradiated to photosensitive drums 200*a* to 200*d* as the image bearing members in each image forming portion Pa to Pd.

Pa is the image forming portion for yellow color (Y), Pb is the image forming portion for magenta color (M), Pc is the image forming portion for cyan color (C), and Pd is the image forming portion for black color (Bk), which form images of the corresponding colors. Since image forming portions Pa to Pd are roughly identical, the details of image forming portion Pa for Y are described below, and the descriptions of the other image forming portions are omitted. In image forming portion Pa, the photosensitive drum 200*a* has a toner image formed on its surface based on an image signal, as described below.

A charging roller 201*a* as a primary charger charges the surface of the photosensitive drum 200*a* to a predetermined potential and prepares it for the formation of an electrostatic latent image. A laser beam from the polygon scanner 31 forms an electrostatic latent image on the surface of the photosensitive drum 200*a* charged to a predetermined potential. A developer 202*a* develops the electrostatic latent image on the photosensitive drum 200*a* to form a toner image. A primary transfer roller 203*a* performs a discharge from the back of the intermediate transfer belt 204 and applies a primary transfer bias of opposite polarity to the toner to transfer the toner image on the photosensitive drum 200*a* onto the intermediate transfer belt 204. After the transfer, the photosensitive drum 200*a* is cleaned on its surface by a cleaner 207*a*.

The toner image on the intermediate transfer belt 204 is transferred to the next image forming portion, and the toner image of each color formed in the respective image forming portions is transferred in the order of Y, M, C, and Bk, in turn, forming a four-color image on its surface. The toner image that has passed through the Bk image forming portion Pd, which is at the most downstream in the rotational direction of the intermediate transfer belt 204, is transferred to the secondary transfer portion, which consists of secondary transfer roller pairs 205 and 206. In the secondary transfer portion, a secondary transfer electric field of opposite polarity to the toner image on the intermediate transfer belt 204 is applied, resulting in a secondary transfer to the recording material.

The recording material is accommodated in a cassette 9. The recording material fed from the cassette 9 is fed to a registration portion 208, which consists of, for example, a pair of registration rollers, and waits in the registration portion 208. The registration portion 208 then controls timing to align the toner image on the intermediate transfer belt 204 with the paper feeding portion, and feeds the recording material to the secondary transfer portion.

The recording material to which the toner image has been transferred in the secondary transfer portion is fed to a fixing device 8, where the toner image on the recording material is fixed to the recording material by heating and pressurizing it. The recording material that has passed through the fixing device 8 is discharged into a discharge tray 7. When double-sided image formation is performed on both sides of the recording material, when the transfer and fixing of the toner image on the first side (front) of the recording material is completed, the front and back of the recording material are reversed through a reverse feeding portion 10, the toner image is transferred and fixed on the second side (back) of the recording material, and the recording material is stacked on the discharge tray 7.

The control portion 30 controls the entire image forming apparatus 1 as described above. In addition, the control portion 30 can make various settings, etc., based on inputs from an operating portion 4 that the image forming apparatus 1 has. The control portion 30 includes a CPU (Central Processing Unit), ROM (Read Only Memory), and RAM (Random Access Memory). The CPU controls each portion while reading a program corresponding to the control procedure stored in the ROM. The RAM stores working data and input data, and the CPU performs control by referring to the data stored in the RAM based on the aforementioned program, etc.

Fixing Device

Next, the configuration of the fixing device 8 in the present embodiment is explained using parts (a) and (b) of FIG. 2. In the present embodiment, a belt-heating type fixing device using an endless belt is employed. In part (a) of FIG. 2, the X direction indicates the feeding direction of the recording material P (not shown), the Y direction indicates the widthwise direction of the recording material that intersects (orthogonal in the present embodiment) the feeding direction of the recording material, and the Z direction indicates the pressing direction, the direction in which the recording material is pressurized at the nip portion N. In the present embodiment, the X, Y, and Z directions are each orthogonal to each other.

The fixing device 8 has a fixing belt (hereinafter referred to as "belt") 301, stay 302, pressure pad (hereinafter referred to as "pad") 303, sliding member 304, pressure roller 305, heating roller 307, and thermistor 308. The belt 301 is an endless, rotatable heating rotating member. The pressure roller 305 as a nip portion forming member is a pressurizing rotating member that contacts the outer circumference of the belt 301 to form a nip portion N for nipping and feeding recording materials.

A sliding member 304 slides against the inner circumference of the belt 301 in the nip portion N. The pad 303 as a backup member is positioned inside the belt 301 to hold the sliding member 304 and the belt 301 between the pressure roller 305 to back up the sliding member 304. The sliding member 304 is arranged to cover the outer circumference of the belt 301 side of the pad 303. Stay 302 is positioned inside the belt 301, opposite the nip portion N across the pad 303, and supports the pad 303. Heating roller 307 is positioned inside the belt 301 so as to stretch the belt 301 and heat the belt 301. Thermistor 308 as a temperature detecting member detects the temperature of the belt 301. Each configuration is described in detail below.

The belt 301 has thermal conductivity and heat resistance, etc., and is a thin-walled cylindrical shape. In the present embodiment, the belt 301 has a three-layer structure with a base layer 301*a*, an elastic layer 301*b* on the periphery of the base layer 301*a*, and a detachable layer 301*c* on its periphery, as shown in part (b) of FIG. 2.

The base layer 301*a* is, for example, 80 μm thick and made of polyimide resin (PI). The elastic layer 301*b*, for example, is 300 μm thick and made of silicone rubber. The detachable layer 301*c* is, for example, 30 μm thick and made of PFA (polyfluoroethylene tetrafluoride/perfluoroalkoxyethylene copolymerization resin) as a fluoropolymer. The belt 301 is stretched by the pad 303 and the heating roller 307. The outer diameter of the belt 301 is 150 mm in the present embodiment.

The pad 303 is positioned inside the belt 301, opposing the pressure roller 305 across the belt 301, and forms a nip portion N that nips and feeds the recording material between the belt 301 and the pressure roller 305. In the present embodiment, the pad 303 is an abbreviated plate-shaped member that is long along the widthwise direction of the belt 301 (longitudinal direction intersecting the rotational direction of the belt 301 and the rotational axis direction of the heating roller 307). The pad 303 is pressed against the pressure roller 305 across the belt 301 to form the nip portion N. The material of pad 303 is LCP (liquid crystal polymer) resin. The pad 303 has a crown shape in a direction perpendicular to the feeding direction so as to compensate for deformation caused by deflection of the stay 302 during pressurization. The sliding member 304 is interposed between the pad 303 and the belt 301. Details of the sliding member 304 are described below.

The pad 303 is supported by the stay 302 as a supporting member located inside the belt 301. That is, the stay 302 is located on the opposite side of the pad 303 from the pressure roller 305 and supports the pad 303. The stay 302 is a rigid reinforcing member with long rigidity along the longitudinal direction of the belt 301 and contacts the pad 303 to support the pad 303. That is, the stay 302 provides strength to the pad 303 and secures the pressing pressure in the nip portion N when the pad 303 is pressed from the pressure roller 305.

The stay 302 is made of metal such as stainless steel, and its cross section (transverse section) orthogonal to the longitudinal direction of the stay 302, which intersects the rotational direction of the belt 301, is rectangular in shape. For example, the stay 302 is made of pultruded SUS304 (stainless steel) with a wall thickness of 3 mm, and its strength is secured by forming the cross section into a hollow in a roughly square shape. The stay 302 may be formed into an abbreviated rectangular shape in cross section by combining multiple sheets of sheet metal and fixing them together by welding or other means.

The material of the stay 302 is not limited to stainless steel as long as its strength can be secured.

The heating roller 307 is positioned inside the belt 301 and tautens the belt 301 together with the pad 303. The heating roller 307 is formed in a cylindrical shape by a metal such as aluminum or stainless steel, and contains a halogen heater 306 as a heating source to heat the belt 301. The heating roller 307 is heated to a predetermined temperature by the halogen heater 306.

The heating roller 307 is also a steering roller that has a center of rotation at one end or near the center in the longitudinal direction and controls the position of the belt 301 in the main scanning direction by generating a stretch difference back and forth by rotating it against the belt 301. The heating roller 307 is also a tension roller, which is attached by a spring supported by a frame (not shown) to apply a predetermined tension to the belt 301.

In the present embodiment, the heating roller 307 is formed by a stainless steel pipe of 1 mm thick, for example. Although one halogen heater 306 may be used, it is desirable to have multiple halogen heaters in view of controlling the temperature distribution in the longitudinal direction (rotational axis direction) of the heating roller 307. The multiple halogen heaters 306 have a light distribution that differs in the longitudinal direction, and the lighting ratio is controlled according to the size of the recording material. In the present embodiment, three halogen heaters 306 are arranged. The heat source is not limited to halogen heaters, but can also be other heaters capable of heating the heating roller 307, such as carbon heaters, for example.

The belt 301 is heated by the heating roller 307 heated by the halogen heater 306 and controlled to a predetermined target temperature according to the type of recording material based on temperature detection by the thermistor 308. The thermistor 308 is positioned opposite the outer circumference of the belt 301 near the center where all sizes of recording material that can be fixed by the fixing device 8 pass through, with respect to the widthwise direction of the belt 301. The thermistor 308 detects the temperature of the belt 301, and the control portion 30 controls the power supplied to the halogen heater 306 so that the temperature detected by the thermistor 308 becomes the target temperature. The thermistor 308 may be a non-contact sensor placed in close proximity to the outer circumference of the belt 301, or it may be a contact sensor placed in contact with the outer circumference of the belt 301.

The pressure roller 305 rotates in contact with the outer circumference of the belt 301 and is also the driving roller that imparts driving force to the belt 301. In the present embodiment, the heating roller 307 is also driven by a drive source (e.g., driving motor) to provide driving force to the belt 301. However, the application of driving force to the heating roller 307 may be omitted. The pressure roller 305 is a roller with a metal core (shaft) 305*c*, an elastic layer 305*b* on the outer circumference of the core 305*c*, and a detachable layer 305*a* on its outer circumference. The metal core 305*c* is made of stainless steel, for example, 72 mm in diameter. The elastic layer 305*b* is made of conductive silicone rubber, for example, 8 mm thick. The detachable layer 305*a* is made of PFA (polyfluoroethylene tetrafluoride/perfluoroalkoxyethylene copolymerization resin) as a fluoropolymer, for example, with a thickness of 100 μm. The pressure roller 305 is rotatably supported by the frame (not shown) of the fixing device 8, and a gear is fixed at one end and connected to a drive source (e.g., driving motor, not shown) via the gear to drive the rotation.

The fixing device 8 heats the toner image while nipping and feeding the recording material P that bears the toner image in the fixing nip portion N formed between the belt 301 and the pressure roller 305. Thus, the fixing device 8 fixes the toner image on the recording material P while nipping and feeding the recording material P. Therefore, it is necessary to have both the function of applying heat and pressure and the function of feeding and the recording material P. The pressure roller 305 is pressured against the sliding member 304 through the belt 301 by a driving roller (not shown). In the present embodiment, the applied pressure (NF) in the nip portion N during image forming, that is, the load value applied to the pad 303 and the pressure roller 305, is 1600 N. The width of the nip portion N in the X direction (feeding direction of the recording material) is set to be 24.5 mm and in the Y direction (widthwise direction of the recording material) to be 326 mm.

The length (nip width) in the feeding direction (X direction) of the nip portion N is formed by the sliding member 304 being pressed against the pressure roller 305 via the belt 301. When the applied pressure (NF) at the nip portion N falls below 900 N, a non-contact area begins to appear between the sliding member 304 and the belt 301, and the required nip width cannot be maintained. Therefore, in the present embodiment, the applied pressure (NF) at the nip portion N, that is, the load value applied to the pad 303 and the pressure roller 305, is set to be 900 N or higher.

Sliding Member

The detailed configuration of the sliding member 304 is shown in parts (a) and (b) of FIG. 3. Part (a) of FIG. 3 is a cross-sectional view of the sliding member 304 when cut in the feeding direction, and part (b) is a plan view of the sliding member 304 from the side of the contact surface between the belt 301 and the sliding member 304. The sliding member 304 is fixed to the stay 302 with screws or the like through the pad 303. The sliding member 304 may be an integral part of the pad 303. It is also acceptable to partially fix the sliding member 304 to the stay 302 or pad 303. For example, both ends of the sliding member 304 in the Y direction (widthwise direction) may be fixed to the pad 303 with screws, etc.

The sliding member 304 consists of a base material layer 304*a* and a sliding layer 304*c*. On the side of the base material layer 304*a* sliding with the belt 301, a plurality of protrusions (embossed portions) 304*b* protruding toward the inner circumferential surface of the belt 301 are formed. The sliding layer 304*c* is provided to cover the surface of the side of the base material layer 304*a* sliding with the belt 301 (including the plurality of protrusions 304*b*).

The base material layer 304*a* should have sufficient heat resistance and strength. Materials include stainless steel, copper, aluminum, engineering plastics (PI (polyimide), PEEK (polyether ether ketone), LCP (liquid crystal polymer), etc.), and metallic materials such as stainless steel, copper, and aluminum are preferred in the present embodiment. In the present embodiment, PI with a thickness of 300 μm was used as the base material layer 304*a*.

The plurality of protrusions 304*b* are formed integrally from the same material as the base layer 304*a* and are positioned in the nip portion N in the feeding direction (X direction) and in the widthwise direction (Y direction) of the recording material, which intersects the feeding direction. The plurality of protrusions 304*b* are provided so that the total area of the leading ends of all of the plurality of protrusions 304*b* is 90% or more of the total area of the side surface of the sliding member 304 that slides against the inner surface of the belt 301.

The distance (spacing) d between the centers of adjacent protrusions 304*b* with respect to the feeding direction and the distance (spacing) d between the centers of adjacent protrusions 304*b* with respect to the widthwise direction are each 1.25 mm or more, preferably 1.4 mm or more. In the present embodiment, the spacing of the plurality of protrusions 304*b* is the same in the feeding direction and the widthwise direction in order to ensure uniform sliding properties with the belt 301, and the respective spacing d is 1.4 mm. However, if the pressure distribution differs between the widthwise direction and feeding direction, the spacing of the protrusions in each direction may be changed according to the pressure distribution.

By providing a plurality of protrusions 304*b* on the side surface of the sliding member 304 that slides against the belt 301, the contact area between the sliding member 304 and the belt 301 is reduced, thereby reducing the sliding resistance between the sliding member 304 and the belt 301.

The sliding layer 304*c* should be coated with fluororesin (PTFE (polytetrafluoroethylene), PFA, etc.) to achieve low friction. In the present embodiment, the sliding member 304 is formed by coating PTFE with a thickness of 20 μm on the surface of the base layer 304*a*, which includes a plurality of protrusions 304*b*. In the present embodiment, a lubricant is applied to the inner surface of the belt 301. As a result, the belt 301 is configured to slide smoothly against the sliding member 304. Silicone oil was used as the lubricant.

The sliding member 304 of the present embodiment is configured to cover the pad 303 both inside and outside the nip portion N. That is, the sliding member 304 covers the entire surface of the pad 303 facing the belt 301, except for the surface opposite the nip portion N. The sliding member 304 may be placed only on the nip portion N of the surface of the pad 303. Although the plurality of protrusions 304*b* are disposed over the entire area of the sliding member 304, if the sliding member 304 is larger than the nip portion N, a configuration in which the plurality of protrusions 304*b* are disposed only in the nip portion N is also acceptable.

Factors Causing Pressure Irregularities Due to Deformation of Sliding Members Next, FIG. 4 is used to explain the principle of pressure irregularities caused by deformation of the sliding member 304. FIG. 4 shows the nip portion N viewed from above in FIG. 2, with the stay 302 and pad 303 not shown for the purpose of explanation. The sliding member 304 is pressured by the pressure roller 305 in the direction of the pad 303 (Z direction) through the belt 301 with a pressure W. The belt 301 is driven by the heating roller 307 and moves in the belt feeding direction (X direction). If the coefficient of friction between the belt 301 and the sliding member 304 is μ, the sliding member 304 is subjected to a force of friction μW in the moving direction of the belt 301.

When the friction force μW becomes large, depending on the rigidity of the sliding member 304, it may buckle and deform in the feeding direction (X direction), causing partial pressure irregularities in the nip portion. When the recording material passes through the nip portion under the condition of this partial pressure irregularity, it is found that the pressure irregularity causes uneven gloss on the image.

In a conventional fixing device, since the applied pressure is relatively small at around 600 N, even if the sliding member is deformed, it is minute and does not cause a problem as an uneven gloss. However, in a wide nip fixing device that is designed for high speed fixing, it was found that this phenomenon becomes apparent when a high pressure of 900 N or more is applied due to an increase in the area to be pressured. In other words, in a wide-nip configuration such as the fixing device 8 in the present embodiment, where a high pressure of 900 N or more is required, if the rigidity of the sliding member 304 is low, pressure irregularities may occur due to deformation of the sliding member 304. This pressure irregularity then becomes a cause of uneven gloss.

Rigidity of the Sliding Member

In order to prevent the above-mentioned gloss irregularities, it is possible to increase the rigidity of the sliding member 304 and reduce the amount of deformation. However, it was found that if the rigidity of the sliding member 304 is increased too much, the pressure distribution in the widthwise direction (Y direction) becomes unstable, and feeding malfunctions such as wrinkling of the recording material may occur.

This phenomenon is explained using part (a) of FIG. 5 through part (b) of FIG. 7. Parts (a) and (b) of FIG. 5 are cross-sectional views of the nip portion viewed from the feeding direction, with the respective parts shown in exaggerated detail. Part (a) of FIG. 5 shows a schematic view of the case where the nip portion N is not pressurized by the pressure roller 305, and part (b) of FIG. 5 shows the case where the nip portion N is pressurized. As shown in part (a) of FIG. 5, the pad 303 has a crown shape that is convex downward on the pressure roller 305 side in the non-pressurized state. When the pressure roller 305 is pressurized, the stay 302 is deformed as shown in part (b) of FIG. 5 due to deflection because of the high load in the wide nip configuration. The crown shape of pad 303 is optimized so that when the stay 302 deflects, the desired pressure distribution is achieved in the widthwise direction (Y direction) within the nip portion N.

The pressure distribution in the widthwise direction (Y direction) within the nip portion N and the feeding force of the recording material P are explained using parts (a) and (b) of FIG. 6. Part (a) of FIG. 6 is a graph of the ideal pressure distribution in the widthwise direction when the crown shape of pad 303 is optimized. Part (b) of FIG. 6 is a schematic view of the distribution of the feeding force of the recording material P at the nip portion N, the force applied to the recording material at the entrance of the nip portion N, and the rotational moment applied to the recording material P. The length of the arrow in the distribution of the feeding force of the recording material P at the nip portion N indicates the magnitude of the feeding force.

In the nip portion N, the pressure at the edge is set higher than in the center of the widthwise direction, as shown in part (b) of FIG. 6, so that the feeding force of the recording material P is increased as it goes to the edge of the widthwise direction. This makes it possible to suppress the occurrence of wrinkles in the recording material by providing a moment to spread the recording material at the entrance of the nip portion N, even when the recording material with low rigidity is fed into the nip portion N.

On the other hand, as a comparative example, parts (a) and (b) of FIG. 7 show the pressure distribution in the widthwise direction and feeding force of the recording material when wrinkling of the recording material occurs when the rigidity of the sliding member 304 is high. Part (a) of FIG. 7 is a graph of the pressure distribution in the widthwise direction in the comparative example. Part (b) of FIG. 7, as in part (b) of FIG. 6, is a schematic view of the distribution of the feeding force of the recording material P at the nip portion N, the force applied to the recording material at the entrance of the nip portion N, and the rotational moment applied to the recording material P, in the configuration of the comparative example.

Unlike the pressure distribution in the widthwise direction in pat (a) of FIG. 6, the pressure distribution in the widthwise direction in part (a) of FIG. 7 has a part where the pressure is locally higher at α. This causes a feeding force distribution as shown in part (b) of FIG. 7, and the rotational moment of this feeding force distribution causes wrinkles in the recording material P at β by exerting inward force on each other at the entrance of the nip portion N.

The following explains the cause of the local pressure increase in a in part(a) of FIG. 7. We consider the case in part (b) of FIG. 5 when the pressure roller 305 is pressured toward the stay 302 side. If the rigidity of the sliding member 304 is low, the sliding member 304 itself has little effect on the pressure distribution in the widthwise direction because the sliding member 304 deforms according to the crown shape optimized by the pad 303.

However, if the rigidity of the sliding member 304 is high, the sliding member 304 itself may affect the pressure distribution in the widthwise direction, resulting in locally high pressure, because the sliding member 304 does not deform according to the crown shape optimized by the pad 303. This phenomenon has little effect if the sliding member 304 is not "warped" and has low flatness, even if the rigidity of the sliding member 304 is high. However, due to variations during mass production and handling by the process, a small amount of "warpage" may occur, resulting in high flatness. This causes the sliding member 304 to partially fail to follow the shape of the pad 303, resulting in locally high pressure as shown in part (a) of FIG. 7, which causes wrinkling of the recording material.

Methods of Measuring Various Parameters

The following describes the method of measuring the Young's modulus E and thickness t of the sliding member, which are the various parameters that are critical in the present implementation. First, the measurement method of Young's modulus E of the sliding member 304 is explained. A Shimadzu AG-X tensile tester was used to measure Young's modulus. The attachments of the AG-X tensile tester were a load cell for 500 N and a mechanical parallel-tightening gripper for 500 N for the zipper. When performing the tensile test, the thermostatic bath temperature was set at 180° C., the pulling speed was set at 5 mm/min, and the results of the thickness measurement were input beforehand.

The thickness measurement used above was entered as the thickness value of the base material layer 304*a*, which has the highest strength of all the layers of the sliding member 304. The modulus of elasticity was calculated in the range of 10 N to 15 N test force of the load cell. This measurement was started after confirming that the thermostatic bath temperature setting for the tensile test had reached 180° C. The dumbbell shape used during the tensile test was the one indicated in JIS K7139-A24. After making 10 measurements each in the longitudinal and widthwise (shortside) directions of the sliding member 304, the average of each was taken to obtain the elastic modulus in the longitudinal and widthwise direction. The average values in the longitudinal and widthwise direction were used for the Young's modulus E [MPa] of the sliding member 304 in this measurement. If the sliding member 304 has many kinds and multiple sliding layers, all are treated as one layer in performing the above procedure.

Next, the method of measuring the thickness t of the sliding member 304 is described. When measuring the thickness t, a sample was prepared by cutting the sliding member 304 into four equal pieces in the Y direction (widthwise direction). The thickness t of the slide member 304 was measured using a CT6001 digital length measuring instrument manufactured by HEIDENHAIN. The temperature and humidity conditions at the time of measurement were 23° C. and 30%. The thickness of the sample was measured at four points in the X direction (feeding direction) for a sample divided into four equal portions, and then the average value of the four equal portions was used as the thickness t[mm] of the sliding member 304. In this measurement, if there is a sliding layer 304*c* as in the case of a sliding member 304, the thickness of the base material layer 304*a* excluding the sliding layer 304*c* is measured.

The method of measuring the friction coefficient μ of the sliding member 304 is described below. When measuring the friction coefficient μ, a 5 mm square sample of the sliding portion of the sliding member 304 was cut out to create a sample. The friction coefficient was measured using the FRP2100 friction and wear tester manufactured by Reska Corporation. The temperature of the measuring table was adjusted to 180° C. to match the actual operating environment, and the belt 301 was cut out in a circular shape of 150 mm and attached to the sample so that the inner surface of the belt 301 would slide against the sample. Silicone oil with a kinematic viscosity of 1000 $mm^2/s$ was applied to the sliding surface of the belt 301 as a lubricant, and the friction coefficient was measured at 250 mm/s in constant rotation speed mode and a load of 10 N.

Image Verification Method

Figure 1:
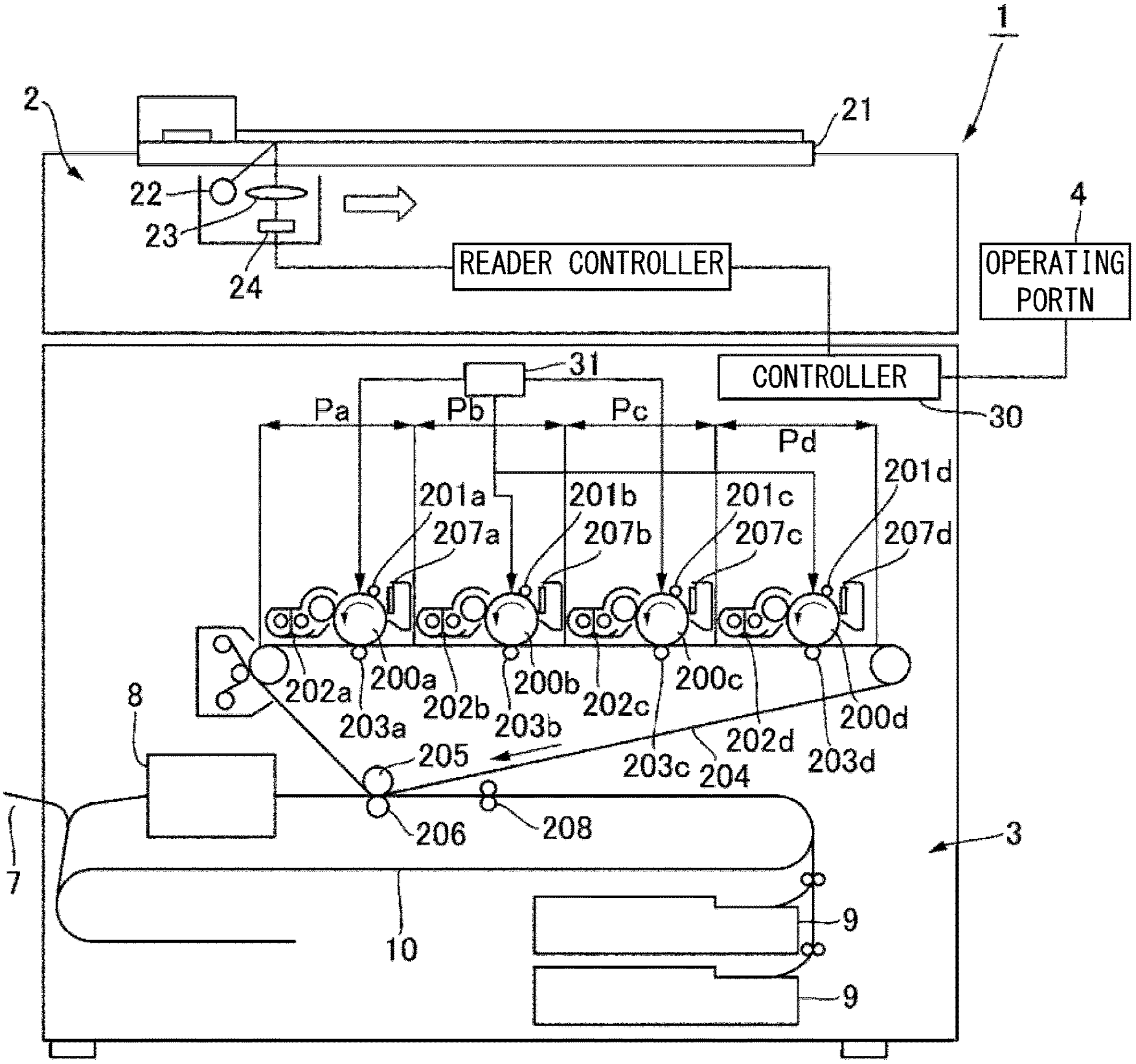
FIG. 1 is a schematic cross-sectional view of the image forming apparatus according to the embodiment.

The following explains the evaluation method used to determine if there are any abnormal images in the image forming apparatus 1 shown in FIG. 1. During the evaluation, a fixing device 8 with the required parameters (E, t, and W) was installed. W is the load applied to the nip portion N. The method of changing the parameters will be explained in the explanatory text of the evaluation of the embodiment described below.

The peripheral speed of the pressure roller 305 on the fixing device 8 was set to 250 mm/sec, and the control portion 30 was controlled so that the detection temperature of the contact thermistor (not shown) contacting the heating roller 307 was 195° C. At the same time, the surface of the belt 301 was monitored with a HORIBA IT-340 infrared radiation thermometer to confirm that the surface temperature of the belt 301 was 180° C.

Then, a black toner image of the recording material was formed, and this toner image was fixed to the recording material in the fixing device 8. A study was conducted to visually check for the presence of image defects on the output black sample image.

The recording material used was OHP film VF-1420N A4 size, manufactured by Kokuyo, in order to make it easier to see image defects. To make it easier to see image defects caused by pressure irregularities, a dark, all-black toner image was formed on the recording material as a sample image. After the fixing device 8 was used, if uneven gloss or uneven density was observed in the center of the sample image, it was judged that the image was defective due to pressure irregularities caused by deformation of the sliding member 304.

Rank 5 is defined as no gloss irregularities at all, Rank 4 is defined as only slight irregularities, Rank 3 is defined as gloss irregularities more visible than Rank 4 but not visible from the back of the OHP film, Rank 1 is defined as gloss irregularities clearly visible from the back of the OHP film, and Rank 2 is defined as gloss irregularities between Rank 3 and Rank 1.

To check the occurrence of wrinkles in the recording material, a black halftone image was output simultaneously on a relatively low stiffness recording material, CS-520 A3T (basis weight 52 $g/m^2$) manufactured by Canon Inc. Ten consecutive sheets were fed through the fixing device 8 to check the rate of wrinkle generation.

Evaluation Procedure and Results

The following describes the evaluation procedure using the configuration of the present embodiment and the results of the evaluation performed by changing the thickness and Young's modulus E of the sliding member 304. The flow of evaluation in evaluation 1 through 4 will be explained along the procedure. First, the various parameters of the fixing device 8 were determined, and the load value W applied to the nip portion N was set accordingly. Young's modulus E, thickness t, and friction coefficient μ were measured and prepared for the sliding member 304. Next, the sliding member 304 was attached to the fixing device 8, and image confirmation verification was performed and judged respectively.

FIG. 8 shows the conditions of the various sliding members used in the evaluation. FIGS. 9 through 12 show graphs with the results of evaluations 1 through 4. ○ in the graph plot indicates cases where no uneven gloss or wrinkles were observed in the image evaluation results, and x in the graph plot indicates cases where uneven gloss or wrinkles were observed in the image evaluation results.

Evaluation 1

In evaluation 1, as shown in FIG. 8, the material and thickness of the base material layer 304*a* of the sliding member 304 were changed, and the level of gloss irregularities in the pressure irregularity factor was checked by changing the stiffness. The sliding member 304 used was all coated with PTFE as the sliding layer 304*c*. The friction coefficient μ was 0.03 due to the PTFE coating. The load value W was set to 1600 N, so the frictional force applied to the sliding part between the sliding member 304 and the belt 301 was μW=48 N. For the rank of gloss irregularity occurrence, the evaluation was made according to the criteria described in the image verification evaluation method.

Pressure irregularities, which are the cause of gloss irregularities, are caused by the deformation of the sliding member 304. If the rigidity of the sliding member 304 can be secured against the frictional force applied to the sliding member 304, the sliding member 304 will not be deformed, and thus pressure irregularities and gloss irregularities will not occur. To investigate the relationship between the frictional force and the rigidity of the sliding member 304, a parameter called the tolerable frictional force ratio is defined and described in the table in FIG. 8. The allowable frictional force ratio consists of the following Formula (1).

$$\frac{\mu W}{\left(\frac{E \times t^3}{L}\right)} \qquad \text{Formula (1)}$$

The numerator in Formula (1) is the frictional force according to the sliding member 304, and the denominator is an index considering the deflection rigidity of the sliding member 304, consisting of Young's modulus E [MPa], thickness t[mm], and length L [mm] in the widthwise direction orthogonal to the feeding direction of the recording material.

FIG. 9 is a graph showing the relationship between the tolerable frictional force ratio and image rank, based on the results of FIG. 8. The results show that as the tolerable frictional force ratio increases, the gloss irregularity rank decreases, and the tolerable frictional force ratio must be 1200 or less to satisfy gloss irregularity rank 5, where no gloss irregularity occurs.

Evaluation 2

In Evaluation 2, in order to examine the relationship between the tolerable frictional force ratio in more detail, the material of the base layer 304*a* of the sliding member 304 was fixed to stainless steel, and the thickness was changed, and the level of gloss irregularities in the pressure irregularity factor was checked by changing the stiffness. As in evaluation 1, all of the sliding members 304 used were coated with PTFE as the sliding layer 304*c*. The friction coefficient μ was 0.03 due to the PTFE coating. The load value W was set to 1600 N, so the frictional force on the sliding portion was μW=48 N.

FIG. 10 is a graph showing the relationship between the thickness t of the base material layer 304*a* of the sliding member 304 and the tolerable frictional force ratio. This result shows that the tolerable frictional force ratio becomes smaller as the thickness t becomes thicker, and that gloss irregularities do not occur at a tolerable frictional force ratio of 1200 or less. This result indicates that by changing the thickness and Young's modulus of the sliding member 304 and setting the tolerable frictional force ratio to 1200 or less, the generation of gloss irregularities due to pressure irregularities can be avoided.

Evaluation 3

In evaluation 3, to examine the relationship between the tolerable frictional force ratio with load, the material of the base layer 304*a* of the sliding member 304 was fixed to stainless steel, the thickness was fixed to 0.04 mm, and the level of gloss irregularities in the pressure irregularity factor was checked by changing the stiffness. The sliding member 304 used as in evaluation 1 was all coated with PTFE as the sliding layer 304*c*. The friction coefficient μ was 0.03 due to the PTFE coating. The load value W applied to the nip portion N was changed from 200 to 2000 N. The relationship between the tolerable frictional force ratio and image rank was investigated while changing the frictional force μW applied to the sliding portion between the sliding member 304 and the belt 301.

FIG. 11 is a graph showing the relationship between the tolerable frictional force ratio and image rank. This result shows that as the load value W applied to the nip portion N increases, the frictional force of the sliding portion increases, resulting in uneven gloss. This result indicates that the occurrence of gloss irregularities due to pressure irregularities can be avoided by changing the thickness t and Young's modulus E of the sliding member 304 according to the load value W applied to the nip portion N, and setting the tolerable frictional force ratio to 1200 or less.

The results of evaluations 1 through 3 indicate that the following Formula (2) regarding the tolerable frictional force ratio can be satisfied to prevent the occurrence of gloss irregularities.

$$\frac{\mu W}{\left(\frac{E \times t^3}{L}\right)} \leq 1200 \qquad \text{Formula (2)}$$

Evaluation 4

In evaluation 4, the same evaluation as in evaluation 2 was conducted by fixing the material of the base material layer 304*a* of the sliding member 304 to stainless steel in order to investigate the effect of wrinkling of the recording material when the rigidity of the sliding member 304 becomes too high. The thickness t of the sliding member 304 was changed in the range of 0.5 to 3.5 mm to check the level of wrinkling of the recording material. The following Formula (3) was used as an index of the stiffness of the base material layer 304*a*, considering local deformation in the widthwise direction (Y direction) and the cross-sectional quadratic moment.

$$\frac{E \times t^3}{12} \text{ [N/mm]} \qquad \text{Formula (3)}$$

The stiffness of the base material layer 304*a* shown in Formula (3) consists of Young's modulus E [MPa] and thickness t[mm] of the sliding member 304. FIG. 12 is a graph showing the relationship between the thickness t of the base material layer 304*a* of the sliding member 304 and the stiffness of the base material layer 304*a*. In the plot of the graph, o marks are the conditions under which wrinkling of the recording material did not occur, and x marks are the conditions under which wrinkling of the recording material occurred. This result shows that when the thickness t of the base material layer 304*a* of the sliding member 304 is thinner than 2.5 mm, wrinkling of the recording material does not occur, but when the thickness t is thicker than 3.0 mm, wrinkling of the recording material does occur. The condition of the stiffness of the base material layer 304*a* that prevents the occurrence of wrinkles in the recording material is less than $2.6 \times 10^5$ [N·mm] from the graph in FIG. 12. The results of evaluation 4 show that satisfying the following Formula (4) can prevent the occurrence of wrinkles in the recording material.

OTHER EMBODIMENTS $$\frac{E \times t^3}{12} \leq 2.6 \times 10^5 \text{ [N·mm]} \qquad \text{Formula (4)}$$

In the above embodiment, the sliding member 304 is described as a configuration example with protrusions 304*b* to reduce sliding resistance with the belt 301. However, the present invention can also be applied to a configuration in which the sliding member does not have protrusions 304*b*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028931, filed Feb. 28, 2022, which is hereby incorporated by reference herein in its entirety.

What is claimed is:

1. A fixing device comprising:

an endless belt configured to apply heat to a recording material;

a rotatable pressing member contacting an outer circumferential surface of the belt; and a sliding member inside of the belt, configured to form a nip portion by nipping and feeding the belt between itself and the rotatable pressing member and to slide on an inner circumferential surface of the belt;

wherein the rotatable pressing member nips and feeds the recording material in the nip portion in cooperation with the belt and fixes a toner image on the recording material by applying heat and pressure, wherein the sliding member includes a substrate extending in a widthwise direction of the belt, wherein the substrate is made of metal and includes a plurality of projections projecting toward the rotatable pressing member, and wherein when a load value applied to the nip portion is defined as W[N], a Young's modulus of the sliding member is defined as E[MPa], a thickness of the sliding member is defined as t[mm], a friction coefficient between the sliding member and the belt is defined as μ, and a length of the siding member with respect to the widthwise direction is defined as L[mm], the sliding member satisfies formulas:

$$\frac{\mu W}{\left(\frac{E\times t^3}{L}\right)} \leq 1200$$

$$\frac{E\times t^3}{12} \leq 2.6\times 10^5\ [\mathrm{N}\cdot\mathrm{mm}].$$

2. The fixing device according to claim 1, wherein a pressurizing force applied to the nip portion is less than 900N.

3. The fixing device according to claim 1, wherein the sliding member includes a sliding layer, on a surface of the substrate thereof, configured to slide on the inner circumferential surface of the belt.

4. The fixing device according to claim 3, wherein the sliding layer is made of a fluororesin.

5. The fixing device according to claim 3, further comprising a holding member configured to hold the sliding member, wherein the holding member is made of resin.

6. The fixing device according to claim 4, wherein the resin of the holding member is different from the fluororesin of the sliding layer.

7. The fixing device according to claim 1, wherein ends of the projections on a side of the rotatable pressing member form a plane.

8. The fixing device according to claim 1, wherein in a cross-section perpendicular to a feeding direction of the recording material, the holding member includes a first area corresponding to a center portion of the nip portion and a second area corresponding to both end portions of the nip portion, and wherein a thickness of the first area is greater than a thickness of the second area.

9. The fixing device according to claim 1, wherein in a cross-section perpendicular to a feeding direction of the recording material, the holding member has a crown shape, which is convex toward the rotatable pressing member.

* * * * *